Feb. 20, 1945.   E. A. BURNS   2,369,658
LAMINATED TRIM PANEL AND METHOD OF FABRICATING SAME
Filed April 1, 1940   2 Sheets-Sheet 1

INVENTOR.
Earl A. Burns
BY
Parker & Burton
attorneys

Feb. 20, 1945.  E. A. BURNS  2,369,658
LAMINATED TRIM PANEL AND METHOD OF FABRICATING SAME
Filed April 1, 1940  2 Sheets-Sheet 2

INVENTOR.
Earl A. Burns
BY
Parker & Burton
attorneys

Patented Feb. 20, 1945

2,369,658

UNITED STATES PATENT OFFICE 2,369,658

LAMINATED TRIM PANEL AND METHOD OF FABRICATING SAME

Earl A. Burns, Detroit, Mich., assignor to Woodall Industries Incorporated, Detroit, Mich., a corporation of Michigan Application April 1, 1940, Serial No. 327,253

12 Claims. (Cl. 154—2)

This invention relates to a decorative laminated trim panel or other decorative laminated Heretofore it has been the practice to fabricate ing the same.

Heretofore it has been the pracice to fabricate laminated trim panels such as are used in the interior of automobile bodies by providing a panel foundation lamination, such as fiber board; superposing a lamination of wadding, such as cotton or paper wadding, upon the foundation layer; superposing a layer of trim material, such as trim cloth, upon the wadding lamination; and then securing the several layers together along compressed lines outlining uncompressed areas, which areas together with the outlining lines of compression make up a decorative design.

Such several layers have heretofore been secured together along the lines of compression mechanically as by stitching or by adhesive. It has also been the practice to provide decorative risers of metal, composition material or cloth covered foundation strips and to secure such risers in place superposing the covering material by suitable securing means, which means preferably extends into the panel foundation board. It has also been the practice to provide riser foundation elements interposed under the cloth and to stitch the cloth down along the sides of the riser. The cloth covered riser foundation formed the decorative riser.

I propose to provide a laminated panel structure possessing such decorative design simply, expeditiously, and economically and without the superposition of decorative riser elements upon the cloth or other trim covering. In my improved construction the decorative riser forms an integral part of the panel structure. My decorative riser is of an improved character and appearance.

By decorative riser I mean a decorative portion which is visible above and overlies a part of the covering material and which may project above the adjacent surface of the covering material or be flush therewith or be depressed below the adjacent surface of the covering material and lie within a depression formed therein however throughout the claims I have denominated such decorative riser as a surface veneer decoration. By laminated panel I mean a laminated structure of panel like form and answering to the definition of the claims herein.

My improved riser decoration while being visible above the covering lamination and overlying a portion of the same extends therethrough and into the wadding layer underneath the covering material and forms a part thereof. Preferably it is also connected through the covering lamination and wadding with the foundation lamination that underlies the wadding. It is formed as a result of a die stamping operation to which the several layers are subjected and it may serve in part at least to hold said several layers together. It is formed of a resinous composition substance such as a thermosetting phenol or urea formaldehyde resin and it may be provided in any desired shape and form and in different colors to harmonize or contrast with the outer layer of covering material.

In the fabrication of this improved decorative panel I provide a panel foundation lamination and position thereover a layer of trim material such as trim cloth. Preferably there is interposed between the panel foundation layer and the trim layer and underneath a determined area of trim material a resinous composition substance which is subjected to treatment to form the riser.

Preferably a layer of wadding is interposed between the foundation layer and trim layer. The resinous composition substance may be carried by the wadding. Such resinous substance may be incorporated throughout a determined area of the wadding as by impregnation of such area of wadding with a solution of the desired resin in excess of the amount required to saturate it after the same has been compressed. Such saturating resin solution may then be heated, dried, and advanced toward its cured state but not completely cured before the hot die stamping operation is carried out thereupon which forms it into the finished riser.

Under pressure of a heated die upon the outer face of the trim layer superposing said resinous substance and urging the trim layer toward the foundation layer, said resinous substance is liquefied and drawn or flowed toward the face of the die through the trim layer. Under the heat and pressure of the die the resin is cured to a hard substantially insoluble and infusible solid state forming a veneer like decorative riser coat over the trim layer and being solidified thereover and therethrough.

Other objects, advantages, and meritorious features of this invention will more fully appear from the following specification, appended claims, and accompanying drawings, wherein:

Figure 1 is a fragment of a side elevation of the interior of an automobile showing a panel embodying my invention in place therein, Figs. 2, 3 and 4 represent successive steps in the formation of a panel embodying the invention herein described as to one modification thereof, Figs. 5 and 6 represent successive steps in the formation of a panel embodying my invention of a slightly different form from that shown in Figs. 2, 3 and 4.

In the various figures of the drawings several slightly different modifications of the invention are illustrated.

Figure 1:
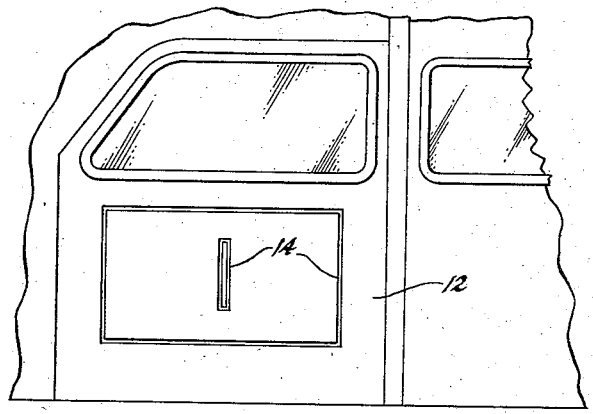

In Fig. 1 there is illustrated one use to which a laminated decorative panel of this type may be put such as an interior trim panel for an automobile door wherein the panel per se is indicated as 12 and is provided with decorative risers 14. The panel embodies in the several figures of the drawings a panel foundation which in each figure is indicated as 16, which foundation may be of any suitable fiber board structure. Masonite is a fiber board which would be suitable for the use. It is relatively strong and rigid and of relatively unvarying dimension notwithstanding atmospheric changes. For purposes of illustration a simple design of panel exhibiting a riser is shown.

A layer of trim material indicated as 18 is provided. This trim material may be of any suitable trim cloth or other decorative covering material which is porous and permeable to the liquid resinous composition employed as desired. The resinous composition is shown in Figs. 2 to 9, inclusive, as carried by a lamination of wadding. The wadding layer itself is in Figs. 1 to 9 of the drawings indicated as 20. This wadding may be of any suitable fluffy porous material such as cotton wadding or wadding formed of cellulose fibers such as are used in the paper industry. It should be absorbent of the resinous material when the same is in solution in a liquid vehicle and it should constitute a wadding suitable to support the cloth throughout the uncompressed areas to give the appearance of upholstered padding.

A certain area of this wadding is saturated or impregnated with the resinous composition when the same is in a liquid solution. This impregnation may be accomplished in any conventional manner. The liquid resinous solution may be sprayed or printed or drawn by suction through the wadding so that throughout the desired area within which the riser is to be formed the wadding will be thoroughly impregnated with an excess of the solution. Such resin impregnated area of the wadding is indicated throughout the several figures as 22. There will be sufficient resin solution in excess of that required to saturate the wadding after the same has been compressed to permit resin being drawn through the overlying layer of trim cloth during the stamping operation. It is desirable to size the wadding on one surface at least so as to impart sufficient stiffness thereto in order that it may be handled readily.

Different resin compositions may be employed; preferably a thermosetting resin will be used. Such a resin sets up hard under heat and pressure. It assumes what might be termed an "infusible, insoluble state." These words are used in conventional and ordinary meaning. It is substantially insoluble and infusible under the conditions it will meet in use and it sets up solid against reversible reaction under ordinary conditions. Different phenol formaldehyde resinous combinations are usable. Some of these are water soluble. Others are alcohol soluble. Certain of the urea resins are also of this character and may be employed. Practically 60% or 70% of solid resin in alcohol or water vehicle is used to saturate the wadding throughout the desired area.

Following this saturation the wadding is put through a heat chamber to advance the resin, and to remove volatile solvent material during this drying operation. This operation advances the resin toward the cured state but does not cure it. The solvent is taken out so that only a very small amount of solvent is retained. This practice is well understood in the industry. The resinous composition remains throughout the desired area of the wadding in a powdery state but containing a certain amount of moisture and adheres to the wadding fibers.

Figure 2:
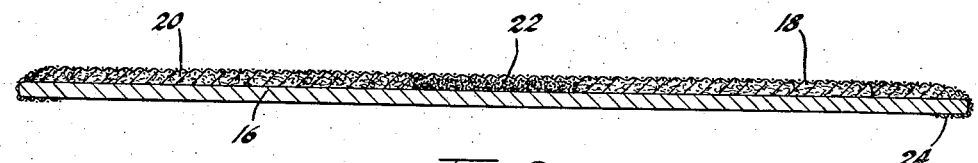
Figure 3:
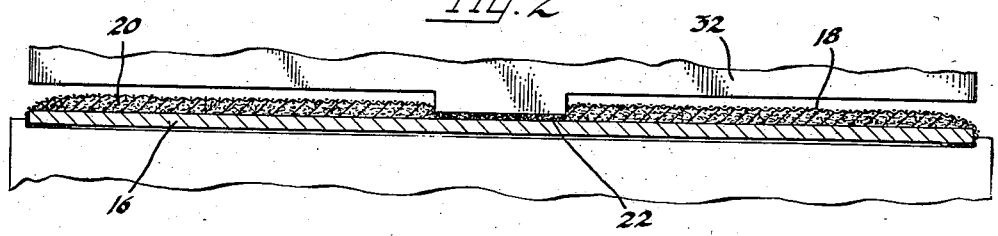
Figure 4:
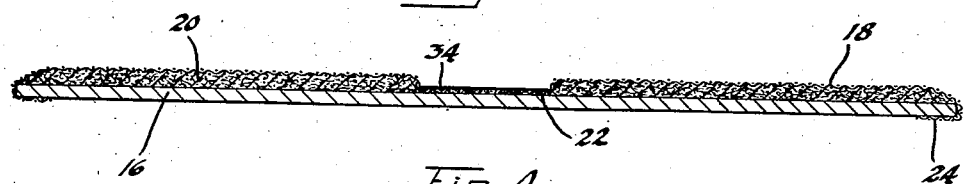

The wadding layer 20 is then placed over the foundation layer 16. Trim cloth is disposed over the wadding layer and drawn over the margin and onto the back of the foundation layer and there adhesively fastened down as at 24. By drawing the trim cloth over the margin and adhering it down as at 24 before die stamping the structure it is possible to achieve a smooth surface free from wrinkles which would be difficult to eliminate if the die stamping operation were carried out first. In certain of the figures, such as Figs. 5 to 9, separate riser foundation elements such as 26 in Figs. 5 to 8 and 28 in Fig. 9 are employed. In Figs. 2 to 4, inclusive, no such separate riser foundation element is provided.

The covered laminated assembly panel structure is supported upon a die element such as 30 as shown in Figs. 3, 4, 5, and 7. A die or force member 32 which is shaped to provide the desired contour of riser and which is supported to be urged downwardly against the laminated panel structure is provided. This force member is so formed that it will contact the panel only at the points desired. In other places it is cut away or relieved as appears from the view of Fig. 3. This force member would be heated in any suitable manner so that the pressure face urged against the trim cloth superposing the resinous composition would be at the desired temperature. The impregnated area of the wadding is preferably oversize the formed riser area so that perfect registration is not required.

In Figs. 2 to 4, which represent the simplest form of construction, the portion which is termed the surface veneer decoration is depressed below the level of the adjacent padded panel areas following completion of the die stamping operations. The hot die is urged against the trim layer as shown in Fig. 3. Under the influence of pressure and heat the resinous material thereunder is liquefied and flows through the trim material toward the die face and spreads over the trim material as a thin veneer underneath the die face forming a coating over the trim layer. Upon completion of the reaction under pressure and heat such resin veneer solidifies into a solid substantially insoluble and infusible state as heretofore defined. Upon removal of the die the operation is complete and there is formed a thin solid veneer like layer 34 over the top of the trim cloth.

The trim cloth as stated would be porous to the liquid resin. The liquid resin might preferably be dyed such color as to harmonize with the trim cloth. This type of trim cloth commonly carries a short pile on its outer surface which would be the upper surface and this pile would be embedded in the resinous composition and the resin would form a thin coating thereover as well as embedding the pile so that it would create the appearance of a riser structure superposing the trim layer. This resinous compound would be solidified not only as a coating overlying the trim cloth but throughout the trim cloth and throughout the wadding and against the foundation board and be adhered to the foundation board. It is obvious that the decorative riser might be of any size and take any shape desired.

Figure 5:
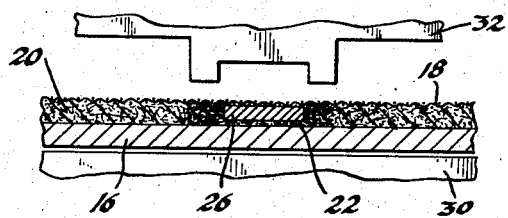
Figure 6:
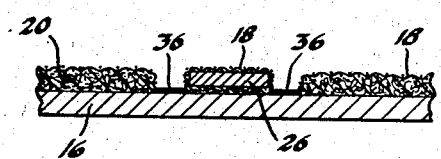
Figure 7:
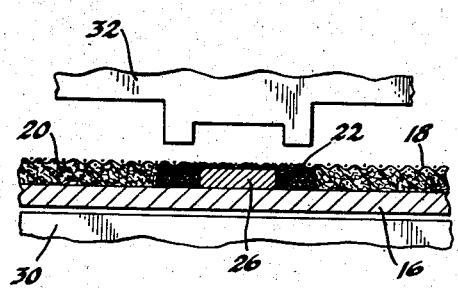
Figs. 7 and 8 represent successive steps in the formation of a panel embodying the invention herein described differing slightly from that shown in the preceding figures.
Figure 8:
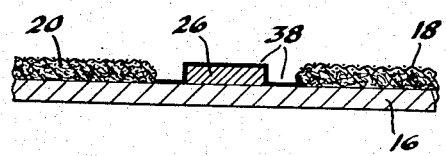
Figure 9:
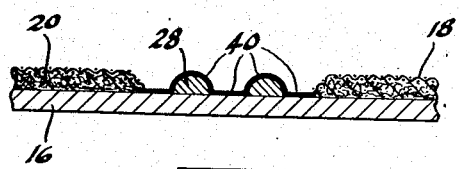
Fig. 9 represents a panel embodying the herein described invention and similar to the construction shown in Figs. 7 and 8, and Figs. 10 and 11, represent panel structures embodying my invention but without the wadding interposed under the cloth.

In Figs. 5 to 9 there are shown riser foundation elements so as to give the riser greater height than it has in Fig. 4. In Figs. 5 and 6 this riser foundation element is indicated as 26 and such foundation may be a strip of fiber board or any other suitable desired material. In Fig. 5 this fiber board strip is placed over the impregnated area of wadding overlying the same underneath the trim cloth. The male die member 32 is shaped so as to provide heated pressure faces which engage the trim cloth along opposite margins of the riser element and react the resinous composition thereunderneath. Along the two opposite edges of the riser and across the top of the riser the trim cloth is drawn taut. A thin veneer or coating of resinous composition is, following being drawn through the trim cloth, solidified into a hard state and forms a solidified decorative resinous line coating or veneer 36 along each margin of the riser element and over the trim cloth as shown in Figures 6, 8, and 9. This solidified resinous composition of course extends through the trim cloth and wadding to the foundation of the panel as heretofore described in connection with the construction of Figs. 3 and 4.

The construction of Figs. 7 and 8 differs from the construction of Figs. 5 and 6 in that in Figs. 7 and 8 the riser element 26 directly superposes the panel foundation underneath the wadding. If desired such riser element 26 may be adhesively secured to the panel foundation. Of course in any of the figures of the drawings the wadding itself may be adhesively secured to the panel foundation if such practice is desired. In these Figures 7 and 8 the riser foundation 26 is superposed by the impregnated area of wadding and when the die stamping operation is completed the resinous composition is solidified not only along the margin of the riser element 26 but over the top of it and forms a thin coat or veneer 38 thereover above the trim layer and along the margin thereof. In this construction the riser projects above the adjacent area of the panel. In the construction of Fig. 6 the riser is flush with the adjacent panel areas.

Fig. 9 is similar to Figs. 7 and 8 except for the fact that the riser foundation strips 28 are differently shaped and a plurality are provided. It is obvious that they might be differently shaped and that any number might be provided. They are disposed in the construction of this figure underneath the impregnated area of wadding as is the riser foundation of Figs. 7 and 8. The die stamping operation results in the formation of a solidified coating of resinous composition 40 over the riser foundation elements and along the margins thereof all as described in connection with the structure of Figs. 7 and 8.

If it were not desired to have a padded panel it is obvious that the wadding might be limited to merely the impregnated area and a raiser formed on top of the foundation board through and over the trim cloth and the trim cloth extend from such riser over the foundation board without any other wadding being interposed therebetween. Such a construction would obviously be entirely feasible. It is also apparent that instead of impregnating an area of wadding this resinous composition in a suitable state might be spread over the desired area of the foundation board underneath the trim cloth or the trim cloth itself might be saturated throughout the desired area of riser formation with the resinous compound.

Figure 10:
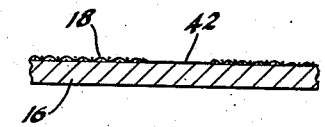

In the construction of Fig. 10 the trim cloth is impregnated with a resin composition throughout a selected area and the riser 42 is formed directly within this impregnated area by drying and hot die pressure in the manner hereinabove described. In this construction there is no wadding provided between the trim cloth and the foundation board. The trim cloth is indicated by the numeral 18 and the foundation board by the numeral 16 as in the other figures.

Figure 11:
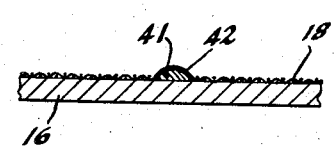

In Fig. 11 a half round riser foundation element 41 is secured to the foundation board 16 and the resin is spread thereover so that the completed riser will project above the surface of the adjacent trim cloth. In Fig. 11, as in Fig. 10, the resin solidifies as a filler or coating 42 on the surface of the trim cloth 18.

What I claim:

1. A trim panel comprising, in combination, a panel foundation lamination, a lamination of wadding overlying the foundation lamination, a lamination of trim material overlying the wadding and secured to the foundation lamination, a resinous composition substance solidified as a decorative surface veneer upon and covering a determined area of the trim material and extending through said trim lamination into the wadding thereunderneath.

2. A trim panel comprising, in combination, a panel foundation lamination, a lamination of wadding overlying the foundation lamination, a lamination of trim material overlying the wadding, a resinous composition solidified as a decorative surface veneer upon and extending as a veneer coat over a determined area of the trim material and extending through a compacted portion of the trim material and wadding to the foundation layer and connected therewith.

3. A trim panel comprising, in combination, a panel foundation, a lamination of wadding overlying the foundation lamination, a lamination of trim material overlying the wadding, a risen element disposed intermediate the trim lamination and the foundation lamination, said wadding being compacted adjacent to the margin of the risen element, a resinous composition substance solidified as a surface veneer upon the outer surface of the trim material and extending there through and through the compacted wadding about the margin of the riser element.

4. A trim panel comprising, in combination, a panel foundation layer, liquid permeable trim material overlying the foundation layer, said material impregnated throughout a given area with a resinous composition a part of which is solidified into a substantially insoluble infusible veneer overlying the surface of the trim material.

5. A trim panel comprising, in combination, a panel foundation layer, a porous trim layer, said trim layer impregnated throughout a given area with a resinous composition a portion of which is solidified and cured into a solid decorative surface veneer overlying the surface of the trim layer and which extends through the trim layer and adhesively secures the same to the foundation layer.

6. That method of fabricating a laminated trim panel comprising a plurality of superposed laminations, one of said laminations being an outer layer of porous trim material, to provide a decorative surface veneer which includes the steps of impregnating the lamination underlying said trim material throughout a preselected area with an unreacted thermosetting resinous composition in an amount in excess of that required to saturate said area when said two laminations are compressed together and compressing the laminations throughout the preselected area while subjecting the same to heat sufficient to fuse the resinous composition to thereby effect a condition of super-saturation in said area and urge the excess resinous material through the trim lamination and concentrate sufficient of it on the outer surface thereof to form a decorative veneer when solidified.

7. That method of fabricating a laminated trim panel comprising a plurality of superposed laminations, one of said laminations being an outer layer of porous trim material, to provide a decorative surface veneer which includes the steps of impregnating one of said laminations throughout a preselected area with an unreacted thermosetting resinous composition in an amount in excess of that required to saturate said area when said two laminations are compressed together and compressing the laminations throughout the preselected area while subjecting the same to heat sufficient to fuse the resinous composition to thereby effect a condition of super-saturation in said area and cause the excess resinous substance to collect in part and cure upon the surface of the trim material, whereby a decorative veneer of cured resinous substance is formed thereon.

8. That method of fabricating a laminated trim panel comprising a plurality of superposed laminations, including a foundation layer and a layer of porous trim material, to provide a surface veneer decoration which includes the steps of impregnating the trim layer throughout a preselected area with an unreacted thermosetting resinous substance in an amount in excess of that required to saturate said layer throughout said area when compressed, and compressing said laminations together throughout said preselected area in the presence of heat applied to the preselected area of trim material sufficient to cause the excess resinous substance to collect and cure upon the surface of the trim material to thereby form a surface veneer decoration of cured resinous substance and to cure throughout the preselected area of trim material and adhere the same to the foundation lamination.

9. That method of fabricating a laminated panel embodying a surface veneer decoration comprising providing a panel foundation lamination, impregnating a wadding lamination throughout a determined area with a solution of a thermosetting resin in excess of that required to saturate the wadding when compressed, removing a part at least of the liquid vehicle from the impregnated area, superposing said wadding layer upon the foundation layer, superposing a lamination of porous covering material upon the wadding layer, compressing said several laminations together between cooperating die members including a heated die force applied to the outer surface of the covering material superposing a part at least of the impregnated area of the wadding thereby reducing the thickness of the saturated wadding and drawing a part of the resinous composition through the porous covering material and solidifying the same underneath the die upon the surface of the covering material into a hard substantially insoluble infusible solid state forming a decorative veneer thereover.

10. That method of fabricating a laminated panel embodying a surface veneer decoration comprising providing a panel foundation lamination, impregnating a layer of porous trim material throughout a determined area with a resinous composition responsive to heat and pressure to assume a substantially insoluble infusible solid cured state and in an amount in excess of that required to saturate the trim material when compressed throughout said area, superposing said trim layer upon the foundation layer, compressing said layers throughout said determined area together between two die members, the die member bearing against the trim layer being heated to a temperature sufficient to concentrate and cure the excess of resinous composition substance into a solid veneer over the top of the trim layer and underneath the die.

11. That method of fabricating a laminated panel embodying a surface veneer decoration comprising depositing upon one face of a panel foundation lamination over a determined area a resinous composition responsive to heat and pressure to assume a hard solid cured state, positioning a layer of trim material pervious to the resinous composition when in the liquid state and having a fibrous pile surface on one face upon the foundation layer so that its opposite face overlies the resinous composition, said resinous composition being present in an amount in excess of that required to saturate the overlying area of trim material when compressed, and compressing said layers together throughout said determined area between two die members, the die member bearing against the trim layer being heated to a temperature sufficient to draw a portion of the resinous composition through the trim material and cure the excess thereof to a solid state underneath the die and overlying the trim material, thereby embedding therein the matted pile of the trim material and forming a decorative resinous veneer thereover.

12. That method of fabricating a laminated panel embodying a surface veneer decoration comprising providing a foundation lamination, impregnating a determined area of wadding lamination with a solution of a thermosetting resin, positioning said layer of wadding upon the foundation layer, positioning a layer of porous trim material upon the layer of wadding, the impregnating resin being present in an amount in excess of that required to saturate the overlying area of trim material when compressed, and compressing said laminations together throughout said determined area between two cooperating die members, the die member bearing against the trim material being heated to a temperature sufficient to draw a part of the resin through the trim layer toward the die to thereby concentrate a portion of the same on the surface of the trim layer and cure the resin into a hard, substantially insoluble and infusible state underneath the die and overlying the trim material, whereby said resinous composition extends therethrough and through the wadding to adhere to the foundation layer and the several layers are thereby adhered together.

EARL A. BURNS.